US011403438B2

(12) United States Patent
Higuchi et al.

(10) Patent No.: US 11,403,438 B2
(45) Date of Patent: Aug. 2, 2022

(54) ARTICLE-STORAGE SIMULATION DEVICE, ARTICLE-STORAGE SIMULATION METHOD, PROGRAM, AND RECORDING MEDIUM

(71) Applicant: Panasonic Intellectual Property Management Co., Ltd., Osaka (JP)

(72) Inventors: Yuichi Higuchi, Osaka (JP); Takeshi Ishikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 613 days.

(21) Appl. No.: 16/331,572

(22) PCT Filed: Oct. 26, 2017

(86) PCT No.: PCT/JP2017/038621
§ 371 (c)(1),
(2) Date: Mar. 8, 2019

(87) PCT Pub. No.: WO2018/092537
PCT Pub. Date: May 24, 2018

(65) Prior Publication Data
US 2019/0213291 A1 Jul. 11, 2019

(30) Foreign Application Priority Data

Nov. 21, 2016 (JP) .............................. JP2016-226365

(51) Int. Cl.
*G06F 30/20* (2020.01)
*G06Q 10/04* (2012.01)
(Continued)

(52) U.S. Cl.
CPC ............. *G06F 30/20* (2020.01); *G06Q 10/04* (2013.01); *G06Q 10/067* (2013.01);
(Continued)

(58) Field of Classification Search
None
See application file for complete search history.

(56) References Cited

U.S. PATENT DOCUMENTS 4,692,876 A    9/1987  Tenma et al.
6,721,762 B1 *  4/2004  Levine ................. G06Q 10/04
(Continued)

FOREIGN PATENT DOCUMENTS

JP    S61-155128 A    7/1986
JP    H07-053049 A    2/1995
JP    2008-265970 A   11/2008

OTHER PUBLICATIONS

"Method for Packing Fragile Items Such as Glass and Ceramics", On line, Travelers cafe world gallery, May 26, 2010.
(Continued)

*Primary Examiner* — Scott A Zare
(74) *Attorney, Agent, or Firm* — Pearne & Gordon LLP

(57) ABSTRACT

An article-storage simulation device includes an acquisition unit that acquires a size of each of the plurality of articles and a size of the storage container. A simulator determines the number of storage containers to be used for storing the articles and a number of articles to be stored by calculation. The calculation uses the acquired size of the articles and the acquired size of the container. The simulator (i) places the article in the container, (ii) determines whether a next article can be placed in the container after the article is placed, and (iii) in a case where the simulator determines that the next article can be placed, places the next article in the container after the article is placed and in a case where the simulator determines that the next article cannot be placed, adds a next container to be used for storing the next article.

7 Claims, 11 Drawing Sheets

(51) Int. Cl.
*G06Q 10/08* (2012.01)
*G06Q 50/28* (2012.01)
*G06F 113/20* (2020.01)
*G16Z 99/00* (2019.01)
*G06Q 10/06* (2012.01)

(52) U.S. Cl.
CPC ........... *G06Q 10/087* (2013.01); *G06Q 50/28* (2013.01); *G16Z 99/00* (2019.02); *G06F 2113/20* (2020.01)

(56) References Cited

U.S. PATENT DOCUMENTS

| | | | | |
|---|---|---|---|---|
| 8,296,101 | B1* | 10/2012 | Barlow | G01N 33/00 |
| | | | | 702/182 |
| 8,560,461 | B1* | 10/2013 | Tian | G06Q 10/087 |
| | | | | 705/332 |
| 10,614,395 | B2* | 4/2020 | Naumann | G06Q 10/04 |
| 2003/0200111 | A1* | 10/2003 | Damji | G06Q 10/08345 |
| | | | | 705/335 |
| 2012/0158327 | A1* | 6/2012 | Hurri | G01R 21/133 |
| | | | | 702/62 |
| 2012/0158627 | A1* | 6/2012 | Arunapuram | G06Q 10/083 |
| | | | | 706/13 |
| 2016/0194153 | A1* | 7/2016 | Issing | B65G 1/137 |
| | | | | 700/216 |
| 2017/0349133 | A1* | 12/2017 | Line | B60R 21/216 |
| 2018/0061255 | A1* | 3/2018 | Ekambaram | G06F 16/44 |

OTHER PUBLICATIONS

International Search Report issued in Patent Application No. PCT/JP2017/038621 dated Nov. 28, 2017.

Written Opinion issued in Patent Application No. PCT/JP2017/038621 dated Nov. 28, 2017.

"Method for Packing Fragile Items Such as Glass and Ceramics", On line, Travelers cafe world gallery, May 26, 2010. (Original Japanese version with partial translation; partial translation also submitted Mar. 8, 2019).

* cited by examiner

FIG. 3

| ARTICLE NAME | ARTICLE NUMBER | COUNT | PLACE | SIZE (WIDTH × LENGTH × HEIGHT (mm)) | WEIGHT (g) | BREAKABILITY | FRAGILITY | RECTANGULARITY | PACKAGING FORM |
|---|---|---|---|---|---|---|---|---|---|
| ELECTRIC APPLIANCE A | AA-01 | 2 | K-002-12 | 100×80×150 | 1300 | 0 | 0 | YES | 0 |
| ELECTRIC APPLIANCE B | AF-13 | 1 | K-001-24 | 120×250×40 | 850 | 0 | 2 | NO | 0 |
| GENERAL MERCHANDISE C | CB-32 | 4 | Z-030-01 | 100×100×150 | 350 | 1 | 0 | YES | 0 |
| GENERAL MERCHANDISE D | CG-86 | 3 | Z-030-56 | 80×80×150 | 300 | 2 | 0 | YES | 1 |
| BASIC COMMODITY E | EA-69 | 5 | N-001-37 | 75×80×180 | 500 | 0 | 1 | NO | 0 |
| BASIC COMMODITY F | ED-52 | 7 | N-332-43 | 80×60×75 | 450 | 2 | 0 | YES | 0 |
| BASIC COMMODITY G | EE-08 | 2 | N-401-28 | 40×80×170 | 120 | 0 | 0 | YES | 0 |
| ... | ... | ... | ... | ... | ... | ... | ... | ... | ... |

| DESTINATION |
|---|
| A03 |

111

| BREAKABILITY OF UPPER ARTICLE | FRAGILITY OF LOWER ARTICLE | | |
|---|---|---|---|
| | 0 | 1 | 2 |
| 0 | OK | OK | NG |
| 1 | OK | OK | NG |
| 2 | OK | NG | NG |

FIG. 11

| ARTICLE NAME | ARTICLE NUMBER | COUNT | PLACE | SIZE (WIDTH × LENGTH × HEIGHT (mm)) | WEIGHT (g) | BREAKABILITY | FRAGILITY | RECTANGULARITY | PACKAGING FORM | STORAGE CONTAINER | STORAGE POSITION |
|---|---|---|---|---|---|---|---|---|---|---|---|
| ELECTRIC APPLIANCE A | AA-01 | 2 | K-002-12 | 100×80×150 | 1300 | 0 | 0 | YES | 0 | 0 | 1,2 |
| GENERAL MERCHANDISE C | CB-32 | 4 | Z-030-01 | 100×100×150 | 350 | 1 | 0 | YES | 0 | 0 | 3 TO 6 |
| GENERAL MERCHANDISE D | CG-86 | 3 | Z-030-56 | 80×80×150 | 300 | 2 | 0 | YES | 1 | 1 | 1,2,3 |
| BASIC COMMODITY F | ED-52 | 7 | N-332-43 | 80×60×75 | 450 | 2 | 0 | YES | 0 | 1 | 4 TO 10 |
| BASIC COMMODITY G | EE-08 | 2 | N-401-28 | 40×80×170 | 120 | 0 | 2 | NO | 0 | 1 | 11,12 |
| ELECTRIC APPLIANCE B | AF-13 | 1 | K-001-24 | 120×250×40 | 850 | 0 | 1 | NO | 0 | 2 | 1 |
| BASIC COMMODITY E | EA-69 | 5 | N-001-37 | 75×80×180 | 500 | ... | ... | ... | 0 | 2 | 2 TO 6 |
| ... | ... | ... | ... | ... | ... | ... | ... | ... | ... | ... | ... |

| DESTINATION | NUMBER OF STORAGE CONTAINERS |
|---|---|
| A03 | 3 |

113

ARTICLE-STORAGE SIMULATION DEVICE, ARTICLE-STORAGE SIMULATION METHOD, PROGRAM, AND RECORDING MEDIUM

TECHNICAL FIELD

The present disclosure relates to an article-storage simulation device, an article-storage simulation method, a program, and a recording medium.

BACKGROUND ART

PTL 1 discloses an article loading system that simulates at which position, in which direction, in which order cargo is loaded and loads the cargo in an optimum order according to the result of the simulation according to an efficient loading method when cargo is loaded on a loading means.

CITATION LIST

Patent Literature

PTL 1: Japanese Patent Unexamined Publication No. 2008-265970

SUMMARY OF THE INVENTION

To achieve the above object, an article-storage simulation device according to one embodiment of the present disclosure is an article-storage simulation device that simulates storage of a plurality of articles in at least one storage container. The article-storage simulation device includes an acquisition unit that acquires a size of each of the plurality of articles and a size of the at least one storage container and a simulator that determines the number of the at least one storage container to be used for storing the plurality of articles and an article to be stored in the at least one storage container by calculation, the calculation using the acquired size of each of the plurality of articles and the size of the at least one storage container. In the calculation, the simulator (i) places the article in the storage container, (ii) determines whether a next article can be placed in the storage container after the article is placed, and (iii) in a case where the simulator determines that the next article can be placed, repeats processing of placing the next article in the storage container after the article is placed and in a case where the simulator determines that the next article cannot be placed, adds a next storage container to be used for storing the next article.

The present disclosure can provide an article-storage simulation device or an article-storage simulation method capable of improving a storage ratio in a container while suppressing influence on articles.

BRIEF DESCRIPTION OF DRAWINGS

FIG. 3 is a diagram showing an example of article information according to the embodiment.

FIG. 11 is a diagram showing an example of output information according to the embodiment.

DESCRIPTION OF EMBODIMENTS

Figure 1:
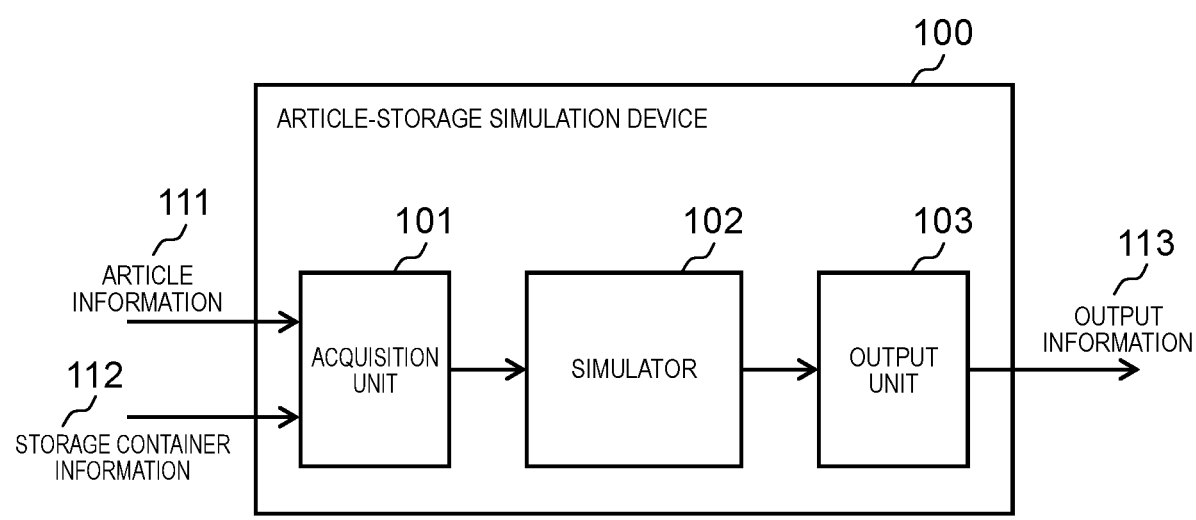
FIG. 1 is a diagram showing a configuration of an article-storage simulation device according to an embodiment.

Prior to describing an embodiment, the problems in the related art will be briefly described.

In picking operations at distribution centers and the like, from the viewpoint of improving operation efficiency, it is desired to be able to grasp in advance the number of container boxes, the storing method, and the like required for storing packages to be picked up based on the list of packages to be picked.

However, in the technique described in PTL 1, even in a case where heavy packages and light and fragile objects are mixed, it is premised on the assumption that the packing ratio is as high as possible in the same storage space and it is not suitable for the case where it is required to minimize the influence on the cargo as much as possible like the picking operation in the distribution center or the like.

Therefore, an object of the present disclosure is to provide an article-storage simulation device or an article-storage simulation method capable of improving a storage ratio in a container while suppressing the influence on articles.

The article-storage simulation device according to one embodiment of the present disclosure is an article-storage simulation device that simulates storage of a plurality of articles in at least one storage container, including an acquisition unit that acquires a size of each of the plurality of articles and a size of the at least one storage container and a simulator that uses the acquired size of each of the plurality of articles and the size of the at least one storage container to determine the number of the at least one storage container to be used for storing the plurality of articles and the articles to be stored in the at least one storage container by calculation, in which in the calculation, the simulator (i) places an article in the storage container, (ii) determines whether a next article is to be placed in the storage container after the article is placed, and (iii) repeats processing of placing the next article in the storage container in a case where it is determined that the next article is to be placed and adds a next storage container to be used for storing the next article in a case where it is determined that the next article is not to be placed after the article is placed.

According to this, the article-storage simulation device adds a storage container in a case where the article cannot be placed in the storage container. In this way, for example, in a case where the influence on the article becomes large, the article-storage simulation device can suppress the influence on the article by adding a storage container. As described above, the article-storage simulation device can improve the storage ratio in the container while suppressing the influence on the article.

For example, the simulator may further determine a storage position of the plurality of articles in the at least one storage container by the calculation.

According to this, for example, since the storage position of the article can be notified to an operator in a picking task, it is possible to improve the operation efficiency of the picking operation.

For example, the acquisition unit may further acquire information indicating destructiveness, which is a degree of destructivity of each of the plurality of articles to other articles, and the simulator may determine placement of each of the plurality of articles based on the destructiveness in the calculation.

According to this, since it is possible to perform an appropriate simulation taking account of the destructiveness of the article, it is possible to reduce the influence on the article.

For example, the acquisition unit may further acquire information indicating fragility of each of the plurality of articles, and the simulator may determine placement of each of the plurality of articles based on the destructiveness and the fragility in the calculation.

According to this, since it is possible to perform an appropriate simulation taking account of the fragility of the article, it is possible to reduce the influence on the article.

For example, the simulator may determine whether or not vertical stacking of each of the plurality of articles is possible based on the destructiveness and the fragility in the calculation.

According to this, since it is possible to determine whether or not vertical stacking is possible by taking account of the destructiveness and the fragility, it is possible to reduce the influence on the article.

For example, in the calculation, the simulator may prevent a destructive article and a fragile article from being placed in the same storage container based on the destructiveness and the fragility.

According to this, it is possible to prevent a destructive article and a fragile article from being stored in the same storage container, it is possible to reduce damage or the like to the articles.

For example, in the calculation, in a case where a fragile article is stored, the simulator may set a packing ratio of a storage container in which the fragile article is stored to be lower than a packing ratio of a storage container in which the fragile article is not stored.

According to this, since it is possible to reduce an amount of articles to be stored in the storage container in which a fragile article is stored, it is possible to reduce damage to the articles.

For example, in the calculation, the simulator may place the fragile article in corners of the at least one storage container based on the fragility.

According to this, it is possible to reduce the damage of the articles and the like by storing fragile articles in corners of the storage container.

For example, the acquisition unit further may acquire information indicating whether or not each shape of the plurality of articles is a rectangular parallelepiped, and in the calculation, the simulator may prevent an article having a rectangular parallelepiped shape and an article not having a rectangular parallelepiped shape from being placed in the same storage container.

According to this, since articles having a non-rectangular parallelepiped shape can be stored in the same storage container, it is possible to improve storage efficiency.

An article-storage simulation method according to one embodiment of the present disclosure is an article-storage simulation method that simulates storage of a plurality of articles in at least one storage container, including an acquisition step of acquiring a size of each of the plurality of articles and a size of the at least one storage container and a simulation step of using the acquired size of each of the plurality of articles and the size of the at least one storage container to determine the number of the at least one storage container to be used for storing the plurality of articles and the articles to be stored in the at least one storage container by calculation, in which in the calculation, in the simulation step, (i) an article is placed in the storage container, (ii) it is determined whether a next article is to be placed in the storage container after the article is placed, and (iii) processing of placing the next article in the storage container after the article is placed is repeated in a case where it is determined that the next article is to be placed and a next storage container to be used for storing the next article is added in a case where it is determined that the next article is not to be placed.

According to this, the article-storage simulation method adds a storage container in a case where the article cannot be placed in the storage container. In this way, for example, in a case where the influence on the article becomes large, the article-storage simulation method can suppress the influence on the article by adding a storage container. As described above, the article-storage simulation method can improve the storage ratio in the container while suppressing the influence on the article.

A program according to one embodiment of the present disclosure causes a computer to execute the article-storage simulation method.

In a recording medium according to one embodiment of the present disclosure, the program is stored.

These generic or specific aspects may be realized by a system, a method, an integrated circuit, a computer program, or a recording medium such as a computer-readable CD-ROM or may be realized by any combination of a system, a method, an integrated circuit, a computer program, and a recording medium.

Hereinafter, an embodiment will be specifically described with reference to drawings. The embodiment described below shows one specific example of the present disclosure. The numerical values, shapes, materials, constituent elements, storage positions and connection modes of the constituent elements, steps, an order of steps, and the like shown in the following embodiment are mere examples and are not intended to limit the present disclosure. In addition, among the constituent elements in the following embodiment, constituent elements not described in the independent claim showing the most significant concept are described as any constituent elements.

Embodiment

First, a configuration of article-storage simulation device 100 according to the present embodiment will be described. FIG. 1 is a diagram showing the configuration of article-storage simulation device 100 according to the present embodiment. Article-storage simulation device 100 is a device for simulating storage of a plurality of articles in storage containers, for example, in a picking task at a distribution center or the like. Specifically, article-storage simulation device 100 determines the number of storage containers (for example, a container box) to be used for storing the plurality of articles, articles to be stored in each storage container, a storage order of each article, a storage position of each article in a storage container, and the like for a plurality of articles to be picked.

Article-storage simulation device 100 includes acquisition unit 101, simulator 102, and output unit 103.

Figure 2:
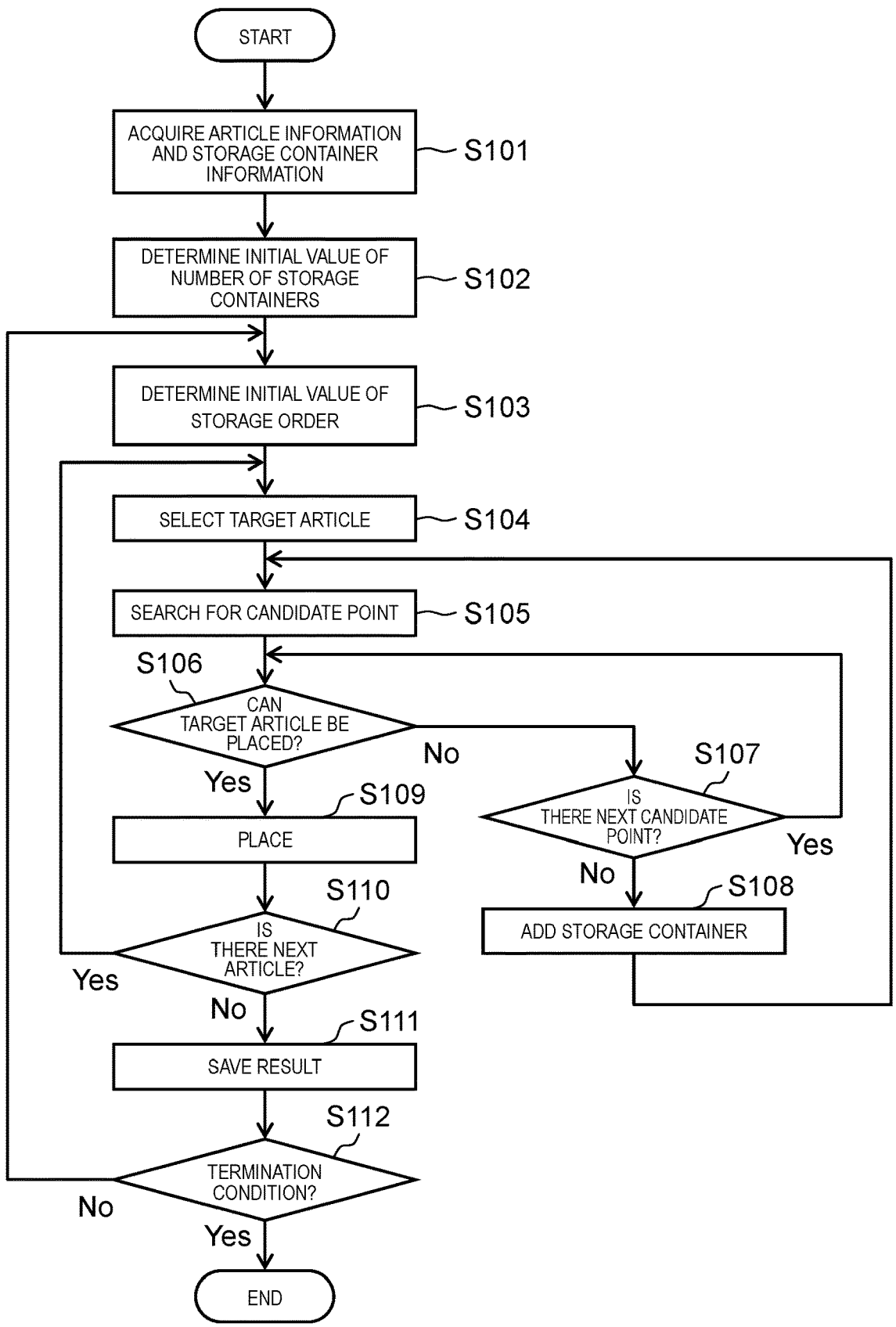
FIG. 2 is a flowchart of article-storage simulation processing according to the embodiment.

FIG. 2 is a flowchart of article-storage simulation processing by article-storage simulation device 100.

First, acquisition unit 101 acquires article information 111 which is information on a plurality of articles to be picked, and storage container information 112 which is information on storage containers (S101).

FIG. 3 is a diagram showing an example of article information 111. As shown in FIG. 3, article information 111 includes information (article name and article number) for specifying an article to be picked, the number of articles to be picked, a place where an article is present, a size of the article, a weight of the article, and a destination of the picked article.

In addition, article information 111 includes attribute information of each article. Specifically, the attribute information includes information indicating fragility of the article, information indicating destructiveness of the article, information indicating rectangularity of the article, and information indicating a packaging form of the article. Here, destructiveness is a degree of destructivity to other articles. For example, heavy articles, articles with high density (specific gravity), or articles with corners are highly destructive.

In addition, here, the fragility and destructiveness of articles are marked in three stages 0, 1, and 2, and the larger the number, the higher the fragility and destructiveness. These pieces of information may be set in two stages or may be set in four or more stages.

In addition, rectangularity indicates whether the shape of an article is a rectangular parallelepiped or not, and in a case where the article has rectangularity, it indicates that the shape of the article is a rectangular parallelepiped. In addition, the packaging form indicates whether or not attention to damage to the exterior of the article is required, and for example, if the packaging form is cardboard or the like, this information is set to 0, and if the packaging form requires attention to damage to the exterior of a cosmetic box or the like, this information is set to 1.

All of these pieces of information are not necessarily included in article information 111, and only some of the information may be included.

In addition, storage container information 112 indicates the shape and size (width, depth, and height) of a storage container.

Next, simulator 102 generates output information 113 by using article information 111 and storage container information 112. Specifically, simulator 102 uses the size of each of the plurality of articles indicated by article information 111 and the size of the storage container indicated by storage container information 112 to determine the number of storage containers to be used for storing a plurality of articles and the articles to be stored in each storage container by calculation.

Specifically, first, simulator 102 determines an initial value of the number of storage containers (S102). For example, simulator 102 uses the size of each of the plurality of articles and the size of the storage container to determine the initial value of the minimum number of storage containers that can store a plurality of articles.

Next, simulator 102 determines an initial value of the order in which a plurality of articles are stored in the storage container (S103). Specifically, simulator 102 determines an initial value of the storage order by using at least one of a plurality of criteria described below.

(1) an article having a larger volume is stored first
(2) an article having a larger bottom area is stored first
(3) a heavier article is stored first
(4) a more destructive article is stored first
(5) a more fragile article is stored later In addition, in a case where a plurality of criteria are used, simulator 102 determines priorities of the plurality of criteria to be used. The "to be stored first" as used herein means to store in a lower row within the storage container, and "to be stored later" means to store in an upper row within the storage container.

Next, simulator 102 selects a target article from the plurality of articles (S104). Specifically, simulator 102 selects a first article in the initial value of the determined storage order.

Figure 4:
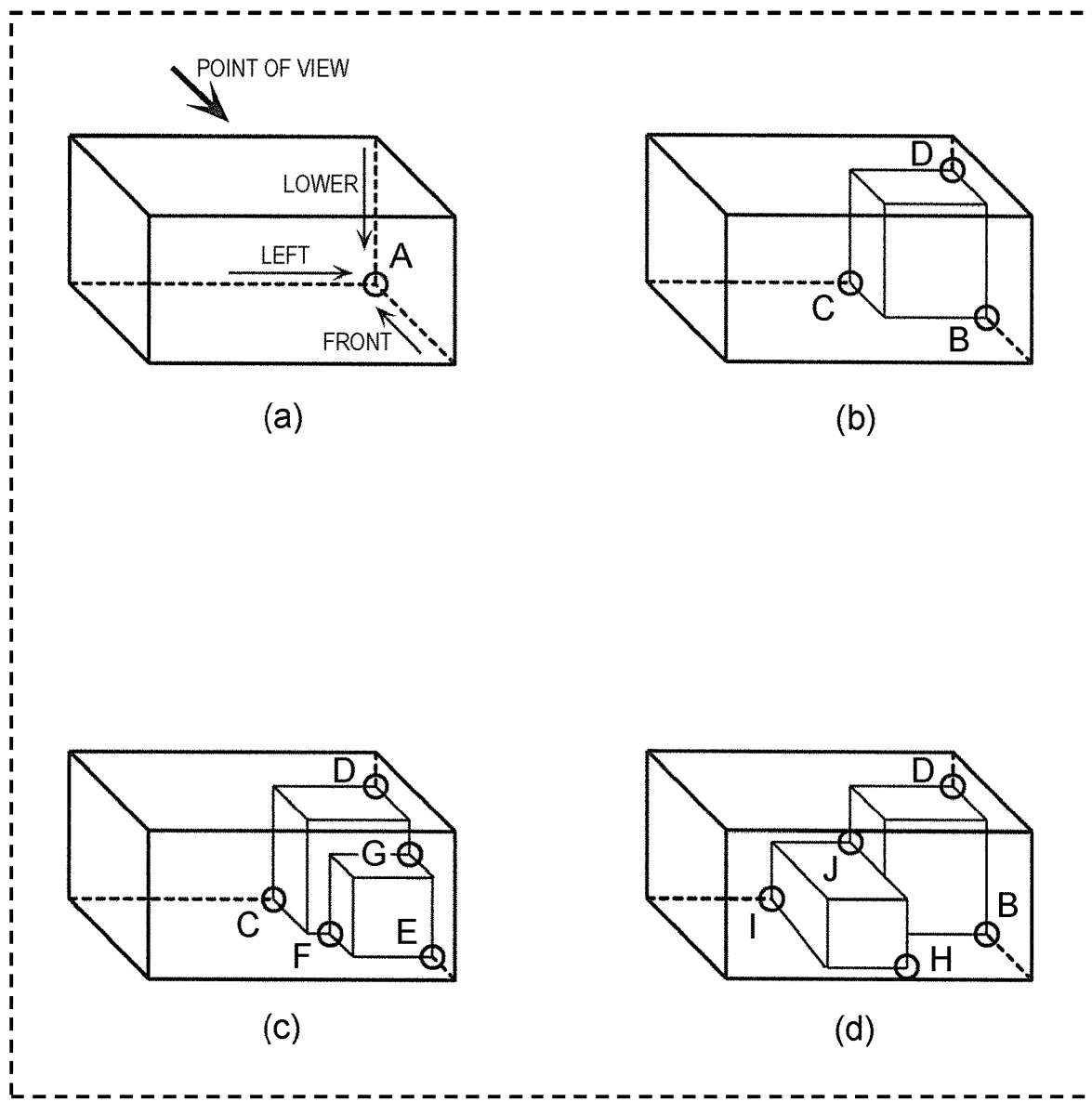
FIG. 4 is a diagram for describing candidate point search processing according to the embodiment.

Next, simulator 102 searches for candidate points for placing a selected target article (S105). Specifically, simulator 102 searches for candidate points by using a Bottom Left Depth (BLD) method. FIG. 4 is a diagram for describing the BLD method. The BLD method is a method of selecting a candidate point that is located on the lowermost (Bottom), the leftmost (Left), and on the foremost side (Depth). In FIG. 4, the direction as viewed from the viewpoint on the back side of the page is shown.

First, as shown in FIG. 4(*a*), in a case where no articles are stored, the lower, left, and back corners of the storage container are a candidate point A. By placing an article at the candidate point A, three candidate points B, C, and D are generated as shown in FIG. 4(*b*). Since priority is given to the lower side, the left side, and the near side in this order, the priority of the candidate point B is the highest, and the priority is higher in order of the candidate points B, C, and D. In addition, an article is placed in order from the candidate point having the highest priority.

Specifically, as shown in FIG. 4(*c*), in a case where an article can be placed at the candidate point B having the highest priority, the article is placed at the candidate point B. Then, new candidate points E, F, and G are generated, and priority is higher in order of the candidate points E, F, C, G, and D.

On the other hand, as shown in FIG. 4(*d*), in a case where an article cannot be placed at the candidate point B, the article is placed at the candidate point C having the next highest priority. Then, new candidate points H, I, and J are generated, and priority is higher in order of the candidate points B, H, I, J, and D.

Such processing is sequentially performed for a plurality of articles. That is, in step S105, one or a plurality of candidate points are searched for according to the current placement state by such a method. In addition, in a case where the number of storage containers is plural, priority is set to a plurality of storage containers, and candidate points of each storage container are searched for. That is, in a case where the candidate point of the highest-priority storage container is selected first and the target article cannot be placed in all the candidate points of the highest-priority storage container, the candidate point of the next highest-priority storage container is selected.

Next, simulator 102 determines whether the target article can be placed at the candidate point having the highest priority obtained in step S105 (S106). Specifically, simulator 102 first determines whether the target article can be placed in the space indicated by the candidate point. For example, in the state shown in FIG. 4(*b*), simulator 102 determines whether the target article can be stored at the candidate point B (FIG. 4(*c*)) and whether the target article cannot be stored at the candidate point B (FIG. 4(*d*)) because the size of the target article is large.

Further, simulator 102 determines whether the target article can be placed in the space indicated by the candidate point by one of the following methods.

Figure 5:
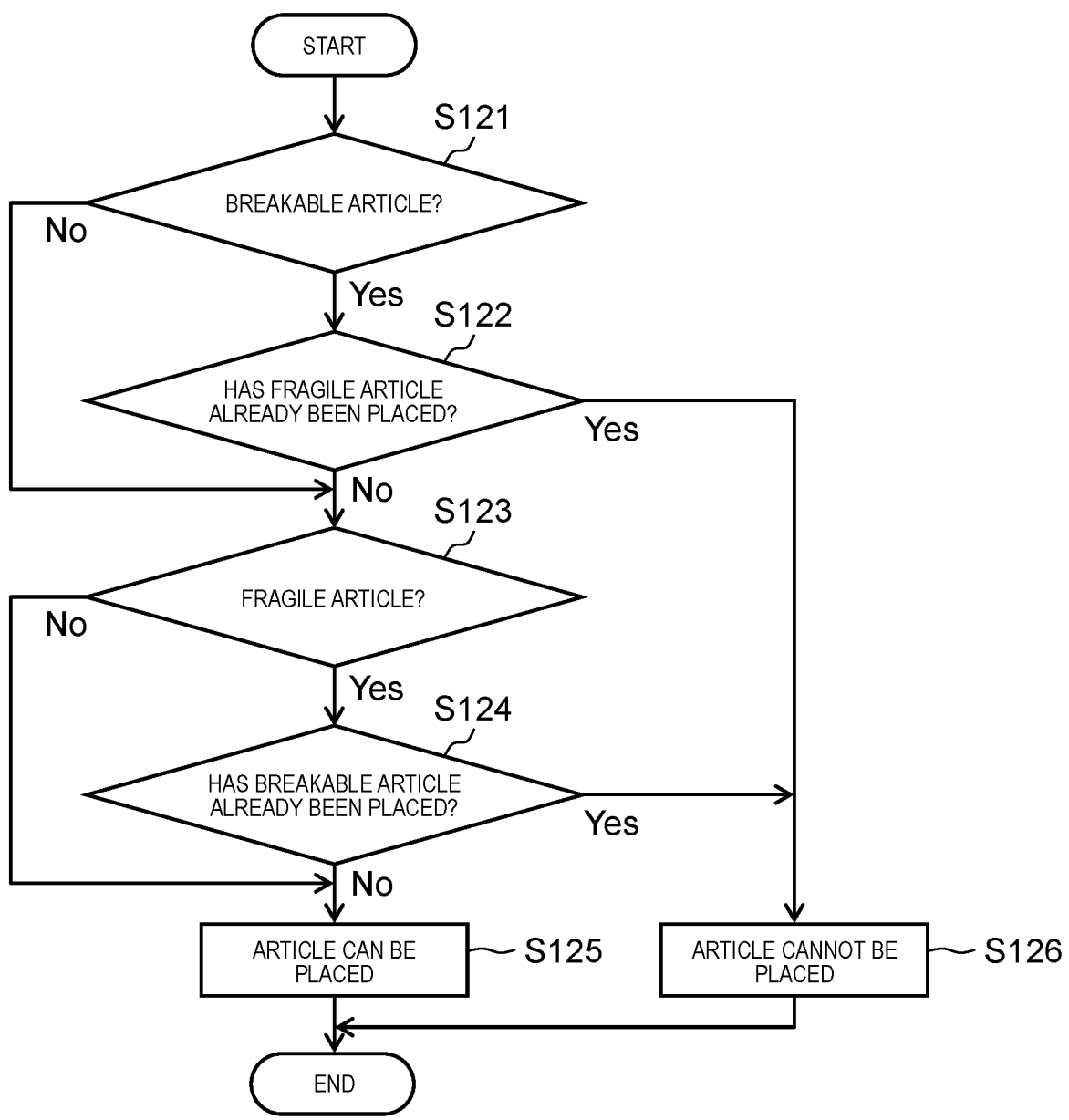
FIG. 5 is a flowchart of a first method of determining whether or not placement is possible according to the embodiment.

As a first method, simulator 102 prevents a fragile article and a destructive article from being placed in the same storage container. For example, simulator 102 performs the processing shown in FIG. 5.

First, in a case where the target article is a destructive article (Yes in S121) and a fragile article has already been placed in the storage container (Yes in S122), simulator 102 determines that the target article cannot be placed (S126).

For example, in a case where the destructiveness indicated by article information 111 is equal to or higher than a predetermined criterion, simulator 102 determines that the target article is a destructive article, and in a case where the destructiveness indicated by article information 111 is less than the above criterion, simulator 102 determines that the target article is not a destructive article. Similarly, in a case where the fragility indicated by article information 111 is equal to or higher than a predetermined criterion, simulator 102 determines that the target article is a fragile article, and in a case where the fragility indicated by article information 111 is less than the above criterion, simulator 102 determines that the target article is not a fragile article.

First, in a case where the target article is a fragile article (Yes in S123) and a destructive article has already been placed in the storage container (Yes in S124), simulator 102 determines that the target article cannot be placed (S126).

In cases other than the above, simulator 102 determines that the target article can be placed (S125).

As described above, since it is possible to prevent a fragile article and a destructive article from being placed in the same storage container, a fragile article can be prevented from being damaged by a destructive article.

As a second method, in a case where a fragile article is stored in the storage container, simulator 102 sets the packing ratio of the storage container lower than that in a case where a fragile article is not stored in the storage container. For example, simulator 102 performs the processing shown in FIG. 6.

Simulator 102 sets the packing ratio of each storage container to a high packing ratio as an initial value. Here, the packing ratio indicates, for example, how much % of the storage container the articles are stored with respect to the capacity (volume) or height of the storage container.

Figure 6:
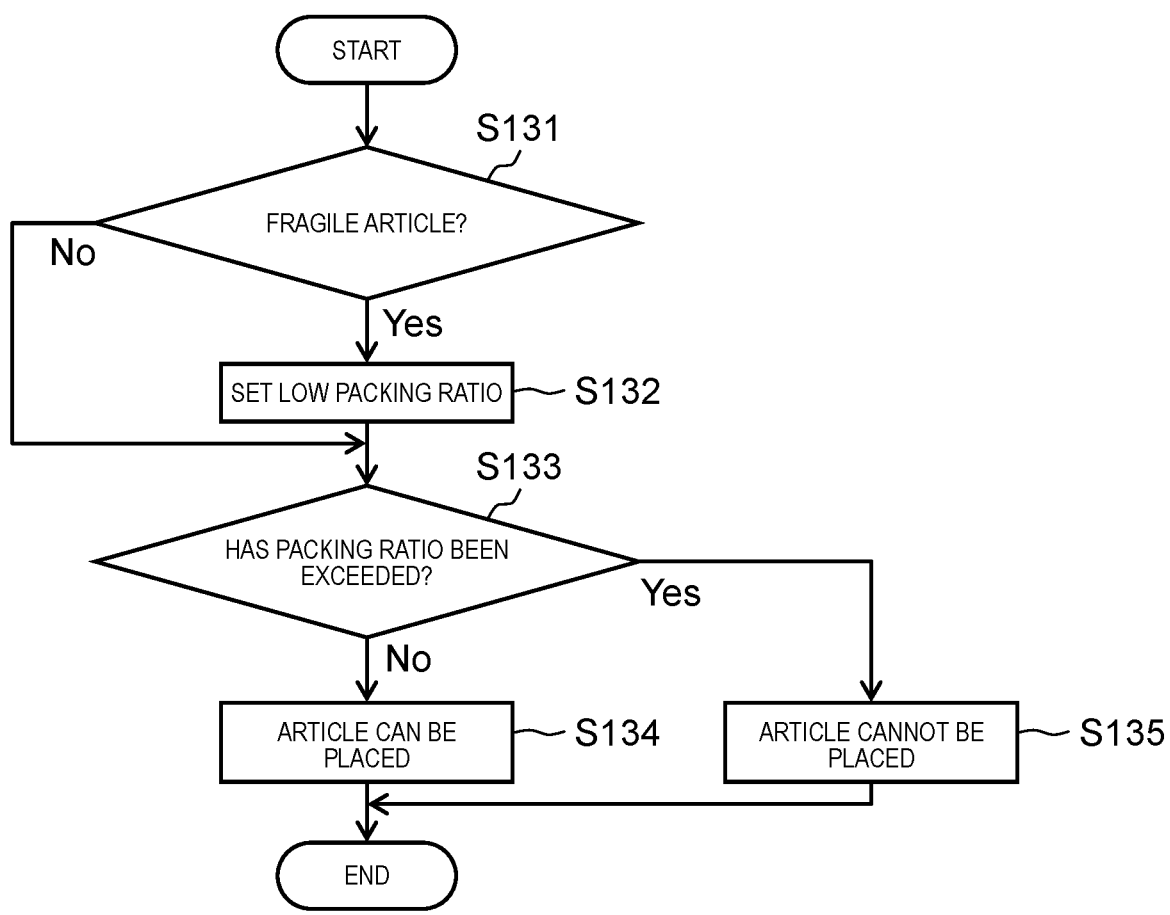
FIG. 6 is a flowchart of a second method of determining whether or not placement is possible according to the embodiment.

As shown in FIG. 6, in a case where the target article is a fragile article (Yes in S131), simulator 102 sets the packing ratio to a low packing ratio lower than a high packing ratio (S132). On the other hand, in a case where the target article is not a fragile article (No in S131), simulator 102 maintains an original high packing ratio.

Next, simulator 102 determines whether the packing ratio exceeds a set value (high packing ratio or low packing ratio) by placing the target article (S133). In a case where the packing ratio does not exceed the set value (No in S133), simulator 102 determines that the target article can be placed (S134), and in a case where the packing ratio exceeds the set value (Yes in S133), simulator 102 determines that the target article cannot be placed (S135).

By repeating the above processing for each article, in a case where even one fragile article is placed in the storage container, a low packing ratio is used for that storage container from then.

As described above, since it is possible to reduce the packing ratio of the storage container in which a fragile article is placed, a fragile article can be prevented from being damaged.

Figure 7:
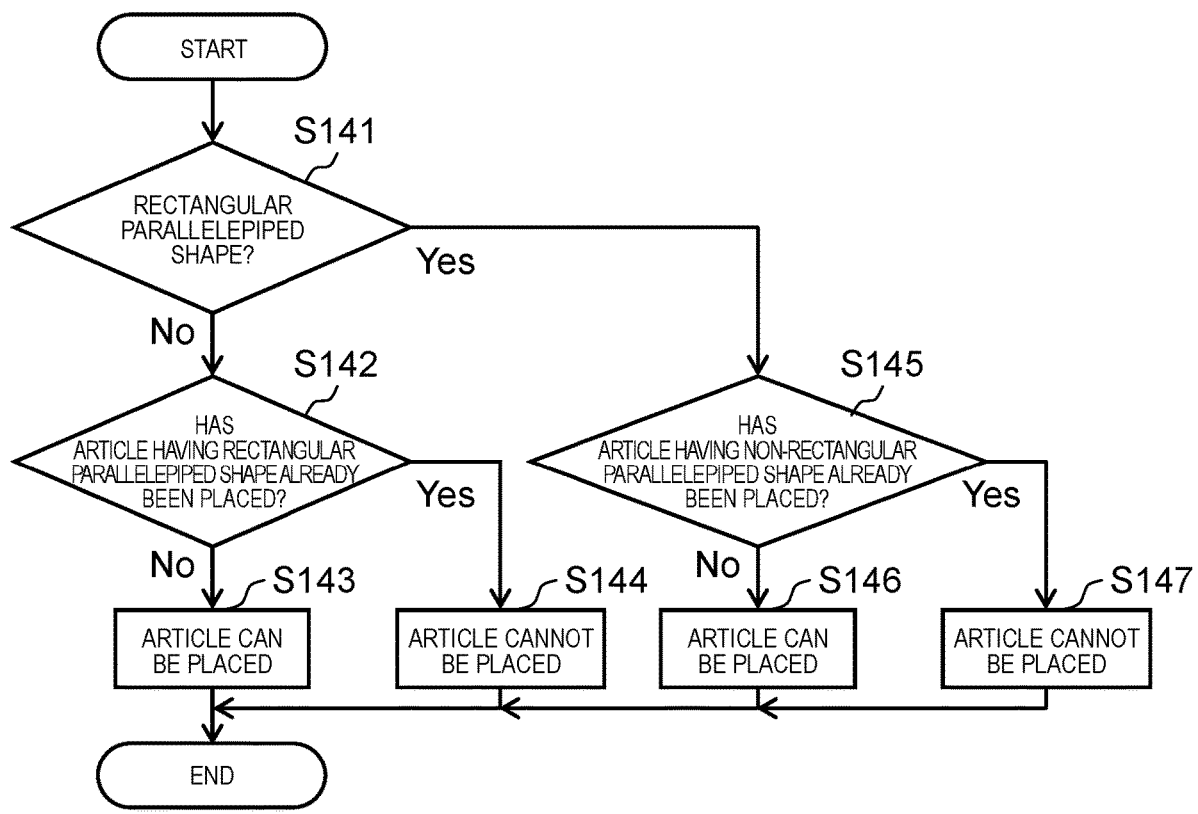
FIG. 7 is a flowchart of a third method of determining whether or not placement is possible according to the embodiment.

As a third method, simulator 102 stores all articles having a non-rectangular parallelepiped shape in the same storage container. That is, simulator 102 prevents a rectangular parallelepiped article and a non-rectangular parallelepiped article from being placed in the same storage container. For example, simulator 102 performs the processing shown in FIG. 7.

In a case where the target article is a non-rectangular parallelepiped (No in S141) and an article having a rectangular parallelepiped shape has been placed in the storage container (Yes in S142), simulator 102 determines that the target article cannot be placed (S144). Simulator 102 refers to the information included in article information 111 to determine whether or not the shape of the article is a rectangular parallelepiped.

In addition, in a case where the shape of the target article is a rectangular parallelepiped (Yes in S141) and an article having a non-rectangular parallelepiped shape has been placed in the storage container (Yes in S145), simulator 102 determines that the target article cannot be placed (S147).

In cases other than the above, simulator 102 determines that the target article can be placed (S143 and S146).

As described above, since it is possible to prevent the article having a rectangular parallelepiped shape and the article having a non-rectangular parallelepiped shape from being placed in the same storage container, the storage efficiency can be improved.

Figure 8:
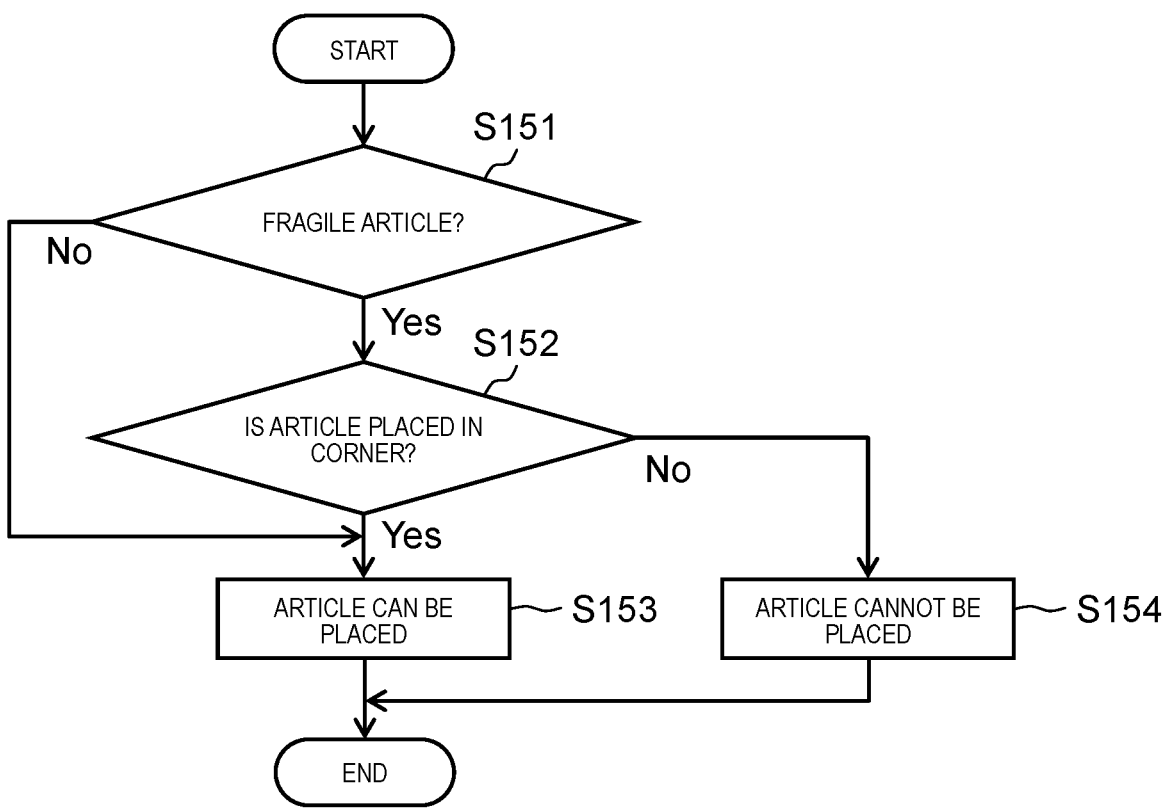
FIG. 8 is a flowchart of a fourth method of determining whether or not placement is possible according to the embodiment.

As a fourth method, simulator 102 places a fragile article at the corners of the storage container. For example, simulator 102 performs the processing shown in FIG. 8.

In a case where the target article is a fragile article (Yes in S151) and is not placed in the corner of the storage container (the candidate point is not the corner of the storage container) (No in S152), simulator 102 determines that the target article cannot be placed (S154). On the other hand, in a case where the target article is a fragile article (Yes in S151) and is placed in the corner of the storage container (the candidate point is the corner of the storage container) (Yes in S152), simulator 102 determines that the target article can be placed (S153). In addition, in a case where the target article is not a fragile article (No in S151), simulator 102 determines that the target article can be placed (S153).

Thus, since fragile articles are placed in the corners of the storage container, it is possible to suppress the damage or the like of the fragile articles.

Figures 9, 10:
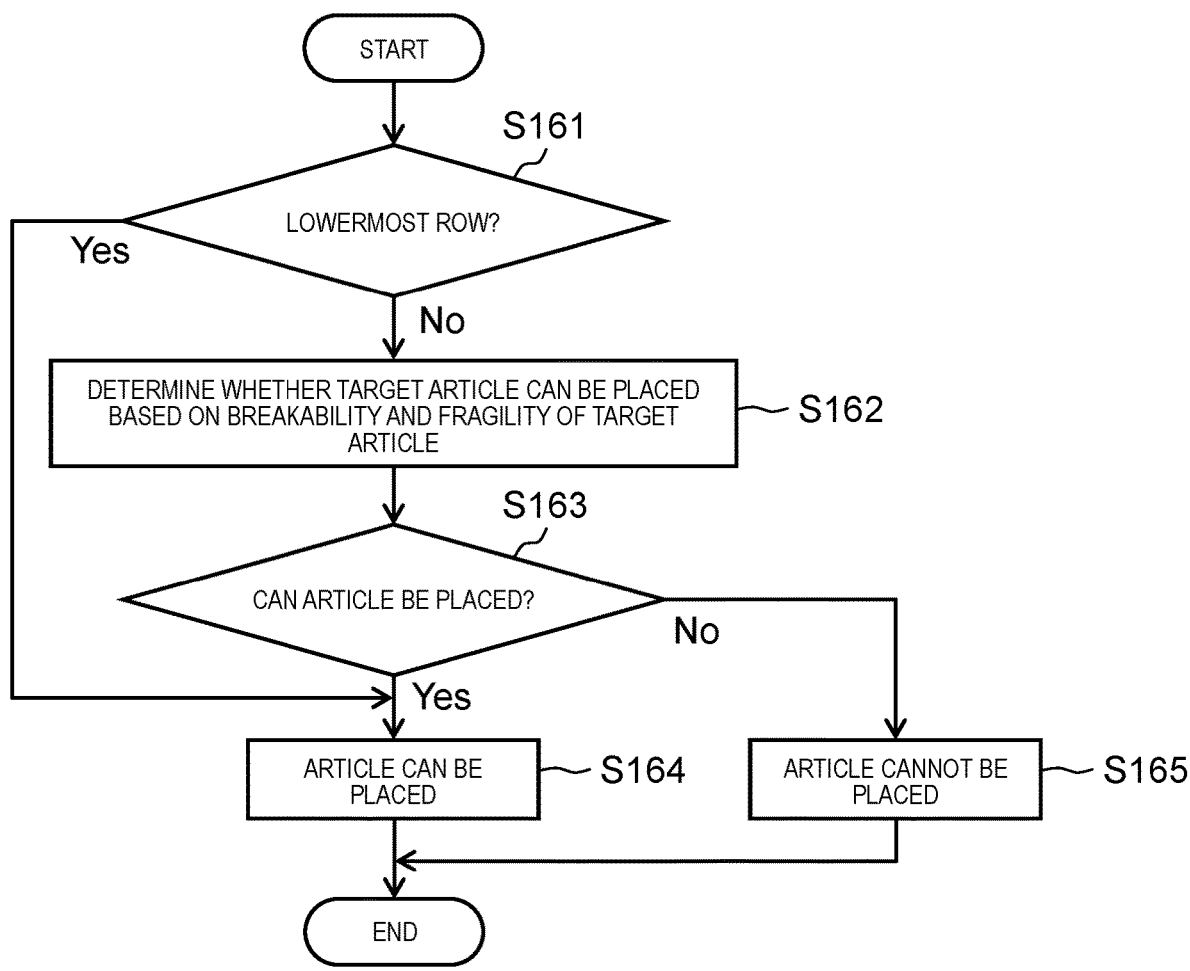
FIG. 9 is a flowchart of a fifth method of determining whether or not placement is possible according to the embodiment.
FIG. 10 is a diagram showing an example of determination criteria of a fifth method of determining whether or not placement is possible according to the embodiment.

As a fifth method, simulator 102 determines whether or not an article is vertically stacked based on the destructiveness and fragility. For example, simulator 102 performs the processing shown in FIG. 9.

In a case where the target article is placed at a position other than the lowermost row, that is, in a case where the target article is placed on the other article (No in S161), simulator 102 determines whether the target article can be placed based on the destructiveness of the target article and the fragility of the article in the lower row (S162 to S165). For example, simulator 102 determines whether the target article can be placed based on the relationship shown in FIG.

10. That is, simulator 102 determines that the target article cannot be placed as the fragility of the lower article is higher and the destructiveness of the upper article is higher.

In addition, in a case where the target article is placed at a position other than the lowermost row (Yes in S161), simulator 102 determines that the target article can be placed (S164).

As described above, since it is possible to prevent destructive articles from being placed on fragile articles, damage or the like of fragile articles can be suppressed.

Simulator 102 may use any one of the first to fifth methods described above, or a plurality of methods may be used.

Description will be made again with reference to FIG. 2. In a case where it is determined that the target article cannot be placed in step S106 (No in S106), simulator 102 determines whether a plurality of candidate points are searched for in the candidate point searching processing (S105) and whether there is a next candidate point (S107). In a case where there is a next candidate point (Yes in S107), the processing in and after step S106 is performed on the next candidate point (next highest-priority candidate point). In addition, as described above, in a case where the number of storage containers is plural, a plurality of candidate points in a plurality of storage containers are sequentially selected.

On the other hand, in a case where there is no next candidate point (No in S107), simulator 102 adds a storage container (S108) and performs the processing in and after step S105 again.

On the other hand, in a case where it is determined that the target article can be placed in step S106 (Yes in S106), simulator 102 places the target article at the candidate point (S109), and in a case where there is a next article (Yes in S110), simulator 102 selects the next article as a target article (S104) and performs the processing in and after step S105 on the selected target article.

In a case where the placement of all the articles indicated by article information 111 is completed (No in S110), simulator 102 saves the simulation result (S111). Here, the simulation result includes (1) the number of storage containers, (2) articles to be stored in each storage container, (3) a storage order of the articles, and (4) storage positions of the articles in the storage container.

Next, simulator 102 determines whether a termination condition is satisfied (S112). For example, simulator 102 determines that the termination condition is satisfied in a case where the number of final storage containers or the increment of the number of storage containers from the initial value is smaller than a predetermined number.

In a case where the termination condition is not satisfied (No in S112), simulator 102 changes the initial value of the storage order (S103) and performs the processing in and after step S104 again. Specifically, simulator 102 changes the criteria to be used out of the plurality of criteria described above or changes the priorities of the plurality of criteria to be used and again determines the initial value of the storage order.

In this way, multiple simulations with different initial values are performed until the termination condition is satisfied. On the other hand, in a case where the termination condition is satisfied (Yes in S112), output unit 103 outputs the simulation result as output information 113 and terminates the processing.

In the determination of the termination condition (S112), in a case where simulations (S103 to S111) having different initial values of the storage order are performed a predetermined number of times, simulator 102 may determine that the termination condition is satisfied. In this case, among the results of a plurality of simulations, for example, a simulation result having the smallest number of containers is output as output information 113.

FIG. 11 is a diagram showing an example of output information 113. As shown in FIG. 11, output information 113 is obtained by adding "number of containers" indicating the number of storage containers to be used for storing a plurality of articles, "storage container" which is information indicating the storage container in which each article is stored (in other words, information indicating the articles to be stored in each storage container) and "storage position" which is information indicating the storage positions of the articles in the storage container to article information 111.

Figure 12:
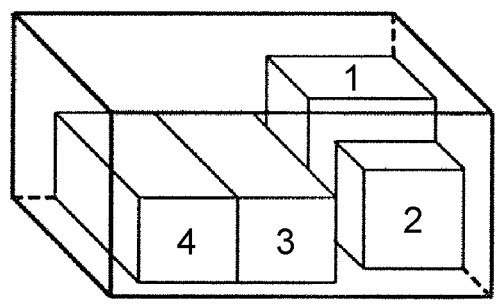
FIG. 12 is a diagram showing a display example of information indicating a storage position according to the embodiment.

In addition, in output information 113, the rows of each article are rearranged according to the storage order in the storage container. For example, in output information 113, rearrangement is performed so that the article to be stored in the storage container first becomes a first row. That is, output information 113 indicates the storage order of the articles. Output information 113 may separately include information indicating the order of storing each article in the storage container. In addition, "storage position" includes, for example, image data indicating the storage position of each article as shown in FIG. 12.

This output information 113 is displayed, for example, on a screen of a portable terminal possessed by the operator performing a picking task. The presentation method of output information 113 is not limited thereto and may be printed on paper or the like and output.

In addition, article information 111 does not need to include all of information on "the number of storage containers", "storage container", "storage position", and a storage order and may include at least one thereof. In addition, FIG. 11 shows an example in which all of the information included in article information 111 is included in output information 113, but only a part of the information included in article information 111 may be included in output information 113.

In addition, the above description shows an example in which a person (operator) performs a picking task, but the method of the present embodiment can also be applied to a case where a robot automatically performs a part or all of the picking task. In this case, the "storage position" included in output information 113 may indicate three-dimensional coordinates or the like in the storage container. In this way, in the case of performing automation by a robot, it is possible to efficiently automate by previously determining the "storage position".

As described above, article-storage simulation device 100 according to the present embodiment can output information indicating the number of storage containers to be used for storing a plurality of articles, articles to be stored in each storage container, the storage order of the plurality of articles, and the storage positions of the plurality of articles. In this way, since the operator of the picking operation can grasp the number of storage containers in advance before the start of the operation, the operation efficiency can be improved. In addition, the operator can efficiently perform the picking operation by using the information indicating the articles to be stored in each storage container, the storage order of the plurality of articles, and the storage positions of the plurality of articles.

Furthermore, in the present embodiment, as shown in FIG. 2, simulator 102 (i) places an article in a storage container (S109), (ii) determines whether a next article can be placed in the storage container after the article is placed (S106), and (iii) repeats the processing (S109) of placing the next article in the storage container in a case where it is determined that the next article can be placed (Yes in S106) and adds a storage container to be used for storing a plurality of articles (S108) in a case where it is determined that the next article cannot be placed (No in S106).

In this way, for example, in a case where the influence on an article becomes large, article-storage simulation device 100 can suppress the influence on the article by adding a storage container. In this manner, article-storage simulation device 100 can improve the storage ratio in the container while suppressing the influence on the article.

Article-storage simulation device according to the embodiment of the present disclosure has been described above, but the present disclosure is not limited to this embodiment.

In addition, each processor included in each device in the article-storage simulation device according to the above embodiment is typically realized as an LSI which is an integrated circuit. These may be separately formed into one chip or may be integrated into one chip so as to include some or all thereof.

In addition, a circuit integration is not limited to an LSI and may be realized by a dedicated circuit or a general-purpose processor. A field programmable gate array (FPGA) that can be programmed after LSI fabrication or a reconfigurable processor that can reconfigure connections and settings of circuit cells inside the LSI may be used.

In addition, in each of the above embodiments, each constituent element may be constituted by dedicated hardware or may be realized by executing a software program suitable for each constituent element. Each constituent element may be realized by a program execution unit such as a CPU or a processor reading and executing a software program recorded on a recording medium such as a hard disk or a semiconductor memory.

In addition, the present disclosure may be realized as an article-storage simulation method executed by an article-storage simulation device.

In addition, the division of functional blocks in the block diagrams is merely an example, and a plurality of functional blocks may be realized as one functional block, one functional block may be divided into a plurality of functional blocks, or some functions may be transferred to another functional block. In addition, single piece of hardware or software may process the functions of a plurality of functional blocks having similar functions in parallel or in time division.

In addition, the order in which each step in the flowchart is executed is for the purpose of describing the present disclosure in detail and may be in an order other than those described above. In addition, a part of the above steps may be executed simultaneously (in parallel) with the other steps.

The article-storage simulation device according to one or a plurality of modes has been described based on the embodiments above, but the present disclosure is not limited to this embodiment. As long as not deviating from the gist of the present disclosure, those skilled in the art may apply various modifications to the present embodiment or the forms constructed by combining the constituent elements in different embodiments may also be included within the scope of one or more aspects.

INDUSTRIAL APPLICABILITY

The present disclosure can be applied to an article-storage simulation device used in a distribution center or the like.

REFERENCE MARKS IN THE DRAWINGS

100 ARTICLE-STORAGE SIMULATION DEVICE
101 ACQUISITION UNIT
102 SIMULATOR
103 OUTPUT UNIT
111 ARTICLE INFORMATION
112 STORAGE CONTAINER INFORMATION
113 OUTPUT INFORMATION

What is claimed is:

1. An article-storage simulation device that simulates storage of a plurality of articles in at least one storage container, the device comprising:
   an acquisition unit that acquires a size of each of the plurality of articles, a size of the at least one storage container, information indicating destructiveness which is a degree of destructivity of each of the plurality of articles to other articles, and information indicating fragility of each of the plurality of articles;
   an output unit;
   a robot; and
   a simulator that determines a number of the at least one storage container to be used for storing the plurality of articles, an article to be stored in the at least one storage container, the storage positions of the plurality of articles in the at least one storage container, the placement of each of the plurality of articles based on the destructiveness and the fragility, and whether or not vertical stacking of each of the plurality of articles is possible based on the destructiveness and the fragility by calculation, the calculation using the acquired size of each of the plurality of articles and the acquired size of the at least one storage container,
   wherein, in the calculation, the simulator
   (i) places the article in the storage container,
   (ii) determines whether a next article can be placed in the storage container after the article is placed,
   in a case where the simulator determines that the next article can be placed, repeats processing of placing the next article in the storage container after the article is placed, and
   in a case where the simulator determines that the next article cannot be placed, adds a next storage container to be used for storing the next article, and
   wherein the output unit outputs a simulation result including the storage positions of the plurality of articles in the at least one storage container, and the robot operates based on the simulation result.

2. The article-storage simulation device of claim 1, wherein, in the calculation, the simulator prevents a destructive article and a fragile article from being placed in a same storage container based on the destructiveness and the fragility.

3. The article-storage simulation device of claim 1, wherein, in the calculation, in a case where a fragile article is stored, the simulator sets a packing ratio of a storage container in which the fragile article is stored to be lower than a packing ratio of a storage container in which the fragile article is not stored.

4. The article-storage simulation device of claim 1, wherein the acquisition unit further acquires information indicating whether or not each shape of the plurality of articles is a rectangular parallelepiped, and
in the calculation, the simulator prevents an article having a rectangular parallelepiped shape and an article having a non-rectangular parallelepiped shape from being placed in a same storage container.

5. The article-storage simulation device of claim 3, further comprising;
a display,
wherein the device visibly displays on the display the number of calculated storage containers to be used for storing the plurality of articles.

6. The article-storage simulation device of claim 1,
wherein, before the calculation, the simulator determines an initial value of the number of storage containers and an initial value of an order of the plurality of articles.

7. An article-storage simulation method for simulating storage of a plurality of articles in at least one storage container, the method comprising:
acquiring a size of each of the plurality of articles, a size of the at least one storage container, information indicating destructiveness which is a degree of destructivity of each of the plurality of articles to other articles, and information indicating fragility of each of the plurality of articles;
determining a number of the at least one storage container to be used for storing the plurality of articles and an article to be stored in the at least one storage container, the storage positions of the plurality of articles in the at least one storage container, the placement of each of the plurality of articles based on the destructiveness and the fragility, and whether or not vertical stacking of each of the plurality of articles is possible based on the destructiveness and the fragility by calculation, the calculation using the acquired size of each of the plurality of articles and the acquired size of the at least one storage container;
an output unit outputting a simulation result; and
a robot operating based on the simulation result,
wherein, in the calculation of the determining,
(i) the article is placed in the storage container,
(ii) it is determined whether a next article can be placed in the storage container after the article is placed, and
(iii) in a case where it is determined that the next article can be placed, processing of placing the next article in the storage container after the article is placed is repeated, and in a case where it is determined that the next article cannot be placed, a next storage container to be used for storing the next article is added.

\* \* \* \* \*